United States Patent
Sattelberger et al.

(10) Patent No.: US 7,137,869 B2
(45) Date of Patent: Nov. 21, 2006

(54) MANUFACTURING CELL FOR THE TREATMENT OF GRINDING AND WHEEL SET TESTING AND PROCEDURES FOR THE OPERATION OF THE MANUFACTURING CELL

(75) Inventors: Klaus Sattelberger, Passau (DE); Klaus Stuchlik, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/389,843

(22) Filed: Mar. 27, 2006

(65) Prior Publication Data
US 2006/0223417 A1    Oct. 5, 2006

(30) Foreign Application Priority Data
Apr. 1, 2005    (DE)    ........... 10 2005 014 911

(51) Int. Cl.
*B24B 1/00* (2006.01)
(52) U.S. Cl. .............. 451/5; 451/47; 451/57; 451/161
(58) Field of Classification Search .......... 451/5, 451/41, 47, 57, 65, 161; 409/8, 40, 55, 37; 51/56 R
See application file for complete search history.

(56) References Cited

U.S. PATENT DOCUMENTS

| | | | | |
|---|---|---|---|---|
| 4,584,794 A | * | 4/1986 | Hirohata | 451/160 |
| 5,343,626 A | * | 9/1994 | Nagata | 33/501.14 |
| 5,857,896 A | * | 1/1999 | Stollberg | 451/47 |
| 6,050,883 A | * | 4/2000 | Wiener | 451/47 |
| 6,669,415 B1 | * | 12/2003 | Stadtfeld et al. | 409/27 |
| 6,715,372 B1 | * | 4/2004 | Hjelm | 73/865.9 |
| 6,840,720 B1 | * | 1/2005 | Mall | 409/8 |
| 6,842,954 B1 | | 1/2005 | Ronneberger | |
| 6,951,501 B1 | * | 10/2005 | Tan | 451/5 |
| 2003/0022601 A1 | * | 1/2003 | Shimomura | 451/47 |

FOREIGN PATENT DOCUMENTS

| | | |
|---|---|---|
| DE | 43 42 648 A1 | 6/1995 |
| DE | 199 29 695 A1 | 3/2001 |
| DE | 101 22 318 A1 | 11/2002 |
| DE | 101 48 387 A1 | 4/2003 |
| DE | 102 40 509 A1 | 3/2004 |
| EP | 0 353 451 A2 | 2/1990 |

* cited by examiner

*Primary Examiner*—Lee D. Wilson
*Assistant Examiner*—Anthony Ojini
(74) *Attorney, Agent, or Firm*—David & Bujold, P.L.L.C.

(57) ABSTRACT

A manufacturing cell for the treatment of grinding of gear wheel flanks, in particular by bevel pinions, and suggested for the wheel set testing, which includes a grinding machine (1), an unreeling test equipment (2), a laser inscription unit (3) with a time band (5) and a robot-supported load system (4), which are concatenated with one another and controllable that the process of pinion loops/wheel set examining/marking and the correction of the grinding machine attitude as a function of the results of the unreeling examination is feasible.

10 Claims, 1 Drawing Sheet

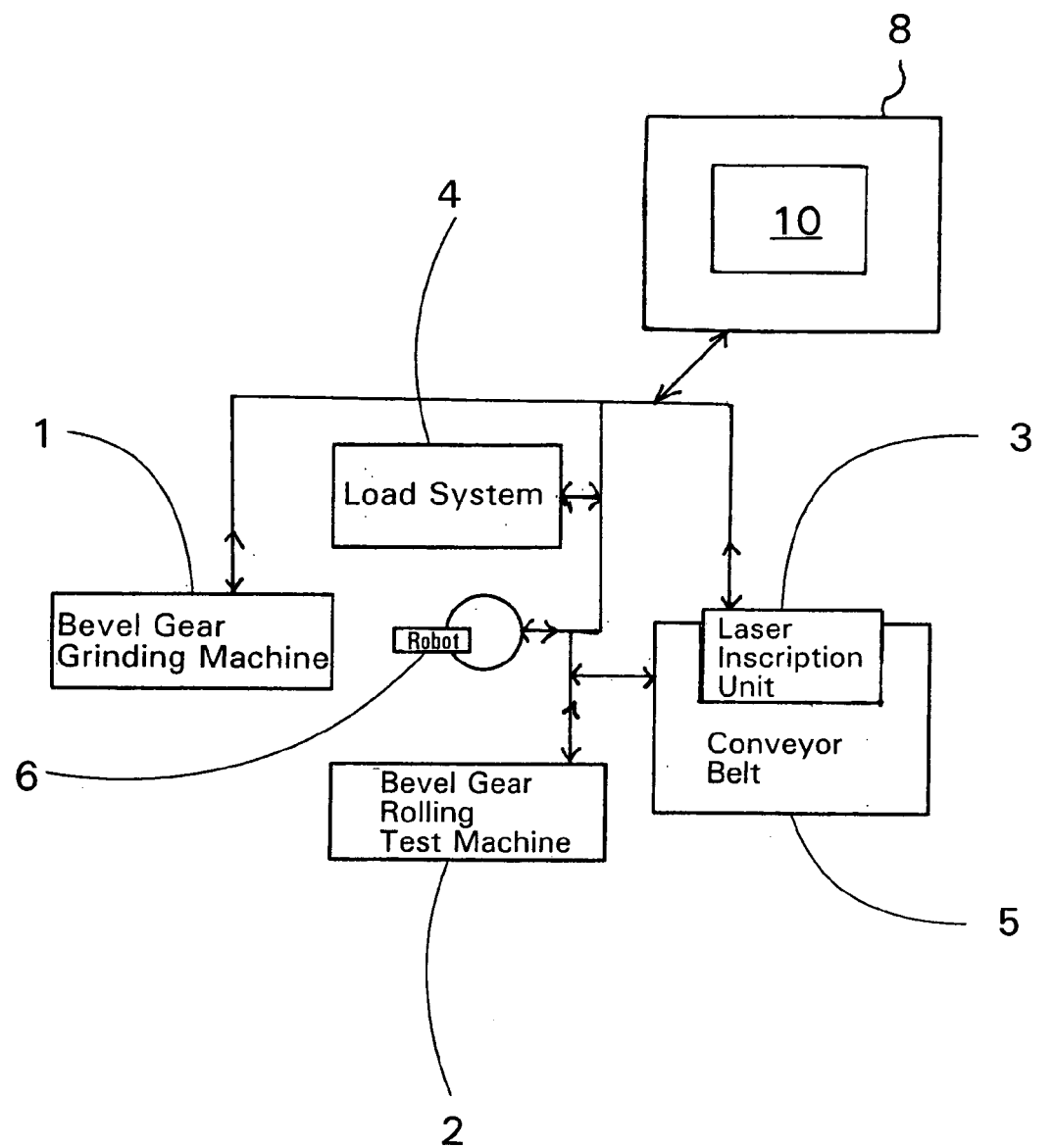

MANUFACTURING CELL FOR THE TREATMENT OF GRINDING AND WHEEL SET TESTING AND PROCEDURES FOR THE OPERATION OF THE MANUFACTURING CELL

This application claims priority from German Application Serial No. 10 2005 014 911.1 filed Apr. 1, 2005.

FIELD OF THE INVENTION

The invention at hand concerns a manufacturing cell for grinding and testing of gear wheels. Moreover the invention relates to a procedure for the operation of the manufacturing cell.

BACKGROUND OF THE INVENTION

Such manufacturing cells serve for the treatment of grinding of gear wheel flanks, for example, of bevel pinions, as well as noise testing of bevel gearsets, in particular for automobile applications.

It is aimed at maintaining the quality and optimizing economy or production systems and/or manufacturing cells constant. From DE 101 22 318 A1, for example, a procedure and a device are well known for the computation of quality capability parameters. Here a digital processing system is used in the framework of which an applicable distribution time model is selected electronically from several distribution time models, whereby the distribution time model describes, at least temporally, a changing average value of the measured values or a temporally changing dispersion of the measured values. Subsequently, the quality capacity characteristics are computed electronically as a function of the statistical methods, which determine the estimated values for characteristics of the distribution time model and indicate suitable mechanisms.

Working and/or test equipments for the grinding of gear wheel flanks, in particular for bevel pinions, and for wheel set examination are well known in the state of the art, whereby a production run consists usually of the following work procedures:

The grinding of gear wheel teeth;
The rolling examination of the gears at different pinion installation distances;
Definition of the installation distance between gears for assembly of the gears by the machine operator, and
Any necessary manual corrections of the gear grinding positions or angles by the operator when the inspection results are outside of the given tolerance.

The arrangement in relation to each other of the machines necessary for these operations may be resolved in different ways. 1:1 allocations of grinding and test equipment with manual operation of the test equipment are known in the prior art, as well as arrangements wherein the grinding and test equipment are separately located.

Performance of the work procedures by manual performance of the grinding and inspection of the wheel set and correction of the grinding machine, results in stresses on the capacity of the personnel. Errors in gear wheel tolerances can develop due to dependence on an operator, which again results in disadvantageous decreases in load-carrying capacity and increases noise problems.

Dependence on an operator for manual grinding machine corrections can also result in lengthy correction preparation times leading to productivity losses. A further disadvantage is that automated statistic processing is not possible concerning noise, since no regulation mechanisms exist.

The invention concerns a manufacturing cell for grinding of gear wheel flanks, in particular for bevel pinions, and for wheel set examination by which the disadvantages of the state of the art are avoided. In particular, the necessary personnel capacity is to be reduced and high productivity with uniform quality is to be ensured. Moreover, a procedure for the operation of the manufacturing cell according to the invention is shown.

SUMMARY OF THE INVENTION

A manufacturing cell for the grinding of gear wheel flanks, in particular for bevel pinions, and for the examination of the gear wheel set, which includes examination of the bevel gear and the grinding machine operation, by means of a rolling gear examination machine, a laser inscription unit and a load system, all of which are concatenated with one another in a controllable manner to perform the process of pinion gear grinding/wheel set testing and marking and the correction of the grinding machine position and angle as a function of the results of the rolling gear examination. A load system for moving the gear wheels among the grinding, the examination and the marking machines is preferably implemented with robot support; and the manufacturing cell, according to the invention, also a conveyor belt which moves the workpiece or a component from one cell to another at determined time periods.

The manufacturing cell includes, according to the invention, a control unit 8 into which a database 10 is integrated, in which the specified allowable tolerances and the inspection results are entered as well as the test met/not met decisions and the position errors.

With the help of this production system, it is possible due to the calculation methods used to statistically specify the frequency at which the wheel set is tested as an automated self-regulating process whereby the described disadvantages of operator dependence are avoided in a favorable way.

In accordance with the invention, the wheel set examination and the laser inscription operations are achieved, independent of an operator, by the development of an evaluation strategy for the automatic definition of the optimal installation distance of the bevel pinion.

During a wheel set examination, the pinion and an associated crown wheel are subjected to different test conditions at different checkpoints whereby, at each checkpoint, a flank rolling examination and/or an oscillation intensity test for structure-borne noise is performed and the results measured and evaluated by way of a Fourier analysis. The measured test values over acceptable noise frequency ranges are compared to test value limits for given checkpoints independently of the operator.

For this purpose, all specified allowable tolerances are entered into the database 10 of the control unit 8 and are available online whereby the tolerances are defined for the optimal installation dimensions which are not specified for the absolute checkpoints but are defined as a function of, for example, a theoretical installation dimension of +0.1 mm.

In accordance with the invention, the test cycle examination is performed at more checkpoints than positions for which examination tolerances are specified so that the number of possible error measurement positions and the probability for an optimal result are increased.

After conclusion of the rolling examination, the inspection result is automatically evaluated. In addition, all measured checkpoints are examined for their suitability as error measurement positions. If several of the positions in which a gear is tested prove suitable as positions at which the gear may be installed, the selection is made according to a variable but definable evaluation range from the results of the measurements. For example, a given position can be considered as minimally/maximally possible depending upon the measurement at that position, or the position having as an evaluation value the smallest sum of definable dimensional errors.

Afterwards the inspection result is entered into a database 10 together with the test met/not met decision and the positional error. This data base 10 forms the basis for the following automatic correction of the grinding machine operations and preserves the traceability/documentation in case of a customer complaint.

Moreover, the determined installation dimension can be transferred automatically to the laser inscription unit.

In accordance with the invention, in contrast to the state of the art, the grinding process with the regulation of the grinding process guided by the geometrical characteristics of the produced teeth profile as established by a 3D-measurement, takes place according to statistical methods. In the technology of the prior art, the noise quality of a bevel gearset cannot always be guaranteed, so that the system of the present invention additionally performs the rolling examination. These results allow fine corrections to be made by the grinding machine operator, based on his or her experience.

In the context of the grinding process, according to the invention, a computational analysis of the theoretical connection between the correction of a machine axle and the effect of the correction is based on a leverage numerical model and the effect is determined for the harmonious meshing of the bevel gearset at different gearset installation distances. For this purpose, a simulation of the manufacturing process and the examination at different measurement positions is carried out. With the help of the theoretical leverage number matrix from process rule software, the grinding machine is corrected automatically whereby the necessary machine correction is determined from the inspection result by means of the leverage number calculation in order to achieve a defined target configuration for harmonious meshing. Each leverage number is multiplied, according to the invention, by an individual effect coefficient whereby the determination/adjustment of the effect coefficient takes place continuously in a self learning process by a comparison of the expected effect of the machine correction with the actually occurring effect of the machine correction on the basis of the inspection results entered into the online database 10.

Inspection results deposited in the online database 10 can be evaluated statistically by a program module and can be set in relation to the gear meshing interference. Thus, in a favorable way, it is possible to automatically specify the test frequency as a function of a stable process.

BRIEF DESCRIPTION OF THE DRAWINGS

The invention will now be described, by way of example, with reference to the accompanying drawings in which:

The sole Figure is a schematic representation of a possible arrangement of the substantial components of the manufacturing cell according to the invention.

DETAILED DESCRIPTION OF THE INVENTION

In accordance with the figure, the manufacturing cell according to the invention has a bevel gear grinding machine 1, a bevel gear rolling test machine 2, a laser inscription unit 3 with a conveyor belt 5 which moves the workpiece or a component from one workplace to another at determined time periods and, preferably, a robot-supported load system 4. The robot is given reference symbol 6 in this Figure. The individual elements of the manufacturing cell are concatenated with one another in such a manner that automatic control by the control unit 8 of the gear grinding process/wheel set examining process/marking process and the correction of the grinding machines position and angle, as a function of the results of the rolling examination, is feasible, as already described.

According to the invention, automation of the manufacturing process is obtained through the development of methods for automatic wheel set positional error and grinding machine correction according to the results of rolling examinations, as described herein above.

REFERENCE NUMERALS

1 bevel gear-grinding machine
2 bevel gear-unreeling test machine
3 laser inscription unit
4 load system
5 conveyor belt
6 robot
8 control unit
10 database

The invention claimed is:

1. A manufacturing cell for the grinding of gearwheel flanks and for the examination of a gear wheel set, the manufacturing cell comprising:
   a grinding machine for grinding the flanks of a gear wheel,
   a rolling gear examination machine for performing a rolling examination on a gear wheel set including the gear wheel,
   a laser inscription unit for marking the gear wheel with an optimal installation distance determined by the rolling examination,
   a load system for moving the gear wheel between the grinding machine, the rolling gear examination machine and the laser inscription unit, and
   a control unit for controlling the grinding machine, the rolling gear examination machine, the laser inscription unit and the load system,
      the control unit being responsive to results of the rolling examination of a gearwheel set for correcting operation of the grinding machine for a subsequent gear wheel.

2. The manufacturing cell according to claim 1, wherein the control unit further comprises:
   an integrated database for storing specified allowable tolerances of rolling examination results, examination results and measured grinding operation positional errors from the examination results.

3. The manufacturing cell according to claim 2, wherein:
   after conclusion of a rolling examination all measured checkpoints are examined for suitability as error measurement positions and, when a plurality of the error measurement positions in which a gear wheel is examined are suitable as positions in which the gear wheel may be installed, a selection of an error measurement position is made according to a defined variable evaluation range determined from the results of the measurements.

4. The manufacturing cell according to claim 1, wherein the gear wheel is a bevel gear.

5. The manufacturing cell according to claim 1, wherein the gear wheel is a pinion gear.

6. The manufacturing cell according to claim 1, wherein:
during examination of a wheel set the gearwheel and an associated crown wheel are subjected to different test conditions at different checkpoints whereby, at each checkpoint, at least one of a rolling examination and an oscillation intensity test for structure-borne noise is performed, and
the results of the at least one of a rolling examination and an oscillation intensity test are measured and evaluated by way of a Fourier analysis.

7. The manufacturing cell according to claim 6, wherein:
the measured test results over acceptable noise frequency ranges are compared to test value limits for given checkpoints independently of an operator.

8. The manufacturing cell according to claim 6, wherein:
allowable tolerances for examination results are stored into the database and are defined for optimal gear wheel installation dimensions which are not specified for a plurality of absolute checkpoints and are defined as a function of at least one theoretical gear wheel installation dimension.

9. The manufacturing cell according to claim 6, wherein:
an examination is performed at more checkpoints than the checkpoints for which examination tolerances are specified so that a number of possible error measurement positions and a probability for an optimal result for a gear wheel installation dimension are increased.

10. The manufacturing cell according to claim 1, wherein:
in correcting the operation of the grinding machine,
the control unit performs a simulation of the grinding process and the examination at a plurality of measurement positions according to a theoretical leverage number matrix to determine a grinding machine correction from the examination results by means of a leverage number calculation wherein each leverage number is multiplied by an individual effect coefficient and whereby a determination/adjustment of the effect coefficient is performed continuously in a self learning process by a comparison of an expected effect of the grinding machine correction with an actually occurring effect of the grinding machine correction.

* * * * *